July 19, 1932.  G. H. SCHIEFERSTEIN  1,867,989
METHOD OF AND MEANS FOR TRANSMITTING ENERGY
IN THE FORM OF MECHANICAL OSCILLATIONS
Filed Jan. 25, 1928
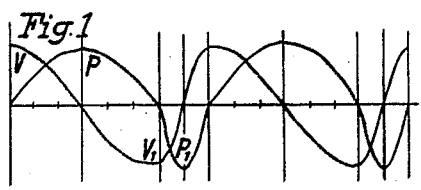
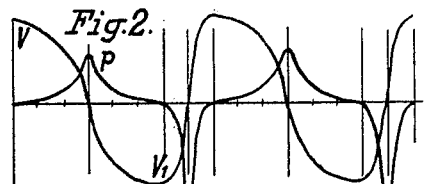
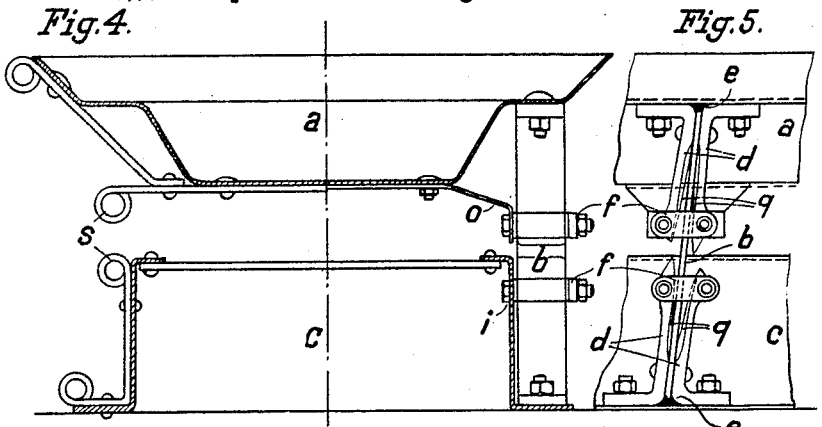
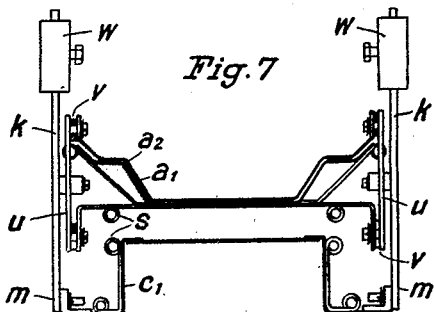
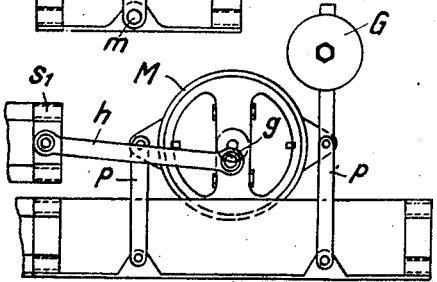
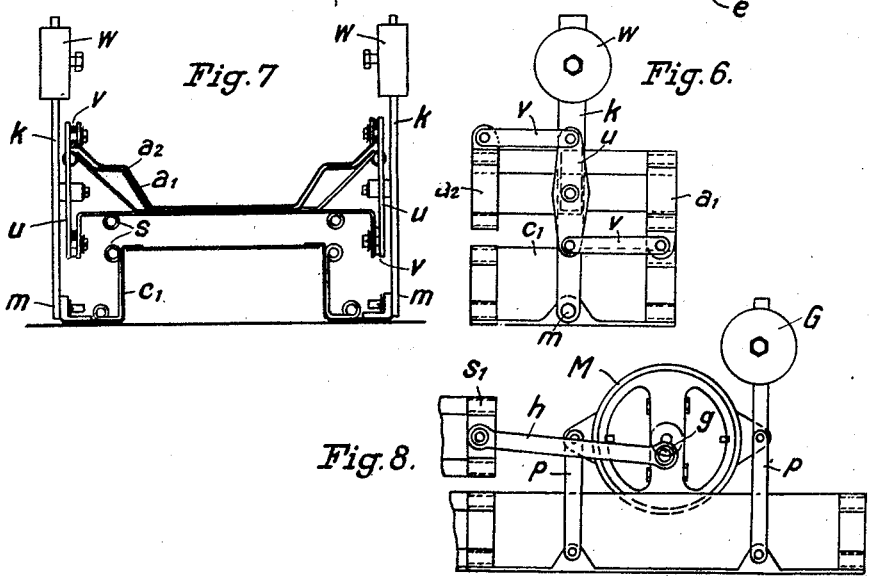
Inventor:
Georg Heinrich Schieferstein Patented July 19, 1932

1,867,989

UNITED STATES PATENT OFFICE

GEORG HEINRICH SCHIEFERSTEIN, OF BERLIN-CHARLOTTENBURG, GERMANY

METHOD OF AND MEANS FOR TRANSMITTING ENERGY IN THE FORM OF MECHANICAL OSCILLATIONS

Application filed January 25, 1928, Serial No. 249,471, and in Germany January 29, 1927.

This invention relates to a method of and means for transmitting energy in the form of mechanical oscillations. In carrying out the invention, use is made of loose-coupled oscillatory systems consisting of a driving means, a driven, so-called oscillatory member composed of two elastically connected masses, and a loose-coupling member, of known type, acting between the driving means and the driven member, and by means of which the oscillatory member receives an amount of energy equal, or approximately equal to the amount of energy consumed by damping.

In such an oscillatory loose-coupled member I employ elastic means, which are adapted to accumulate energy and which, given constant kinetic energy of the oscillating mass set up, on the one side of the central position, a semi-oscillation the frequency of which differs, up to a multiple, from the semi-oscillation generated on the other side of the central position.

In a unit according to the present invention, the oscillation phenomenon takes the course represented by the curves in Figs. 1 and 2 of the accompanying drawing where:

An oscillating mass is moved outward from its central position with the maximum velocity V and, after the first quarter period, generates the maximum tension P in the elastic medium. After the direction of movement has been reversed, the force P again accelerates the mass, which, after a further quarter period, again displays the velocity V. In the next quarter period, which may occupy for example, one-third the time of the two preceding ones, the tension, however, increases to $P_1 = 3P$, and, at the end of a further quarter oscillation, returns to zero, thereby again imparting the velocity V to the mass, and so on.

Fig. 1 represents harmonic oscillations corresponding to a linear increase in the resistance of the elastic medium; and Fig. 2 represents inharmonic oscillations corresponding to more than a linear increase in the resistance of the elastic medium.

Figs. 1 and 2 therefore show that, by employing accumulative means, with an asymmetrical action, in the oscillatory-system, the oscillation of the mass out of and again into the central position is composed in each case of a short and a long harmonic or inharmonic semiperiod, that the movement of the mass, with a constant mass energy, out of the one direction, is reflected in a shorter period of time than out of the other direction; or that, with a constant maximum velocity in the central position, the energy of the mass on both sides of the central position is accumulated along a shorter or longer path, and that, moreover, each semi period may be harmonic or inharmonic, or that the one may be harmonic and the other inharmonic.

According to the present invention, also, several asymmetrically oscillating systems, each having an equal periodicity, may be disposed in series and rigidly connected together, the aggregation exhibiting the same periodicity as each of the components. The serially disposed individual oscillatory systems transmit from one to the other only the coupled energy, but not the energy oscillating in the system. The connection in series can be effected by the interposition of a loose coupling, by which means a difference of amplitude may also be set up between the systems, without disturbance.

By increasing the length of the serially disposed oscillatory systems, a reversing lever may be employed for balancing the unilateral forces, when there is an even number of similar members. If unequal, members are to be actuated and an endeavour is made to balance the asymmetrical movement, the reversing lever may be combined with loose-coupling means. In some cases it is advantageous, for actuating serially disposed, asymmetrically oscillating systems, to employ a plurality of loose-coupling means, adapted to be adjusted either singly or conjointly.

An asymmetrically oscillating unit is adapted, per se, to perform for example conveying work. Its elastic accumulative medium can, however, be disposed obliquely in order to lessen the friction between the handled material and its support, the angle of slope being preferably limited to such a degree that the resulting transverse component remains inferior to the weight-component of the unit.

The conveyor mechanism illustrated in the accompanying drawing represents a practical embodiment of the present invention.

Figs. 1 and 2 show the previously mentioned graphic representation of the oscillation phenomena;

Fig. 3 shows an embodiment of the invention as a jig conveyor or trough;

Figs. 5, 6, and 8 are elevations of different parts of Fig. 3 on a less reduced scale;

Figs. 4 and 7 represent sections along A—A and B—B of Fig. 3 on a less reduced scale.

In Fig. 3, $a$ denotes the actual trough, composed of individual sections, and $c$ the similarly built up main body, the two being connected together by springs $b$. The trough may be of any convenient shape and fastened together by screw connections $s$ or any other means of attachment. The same applies also to the main body, which may also be provided with spurs $l$ at certain intervals. The main body may, like the trough, consist of sheet metal sections or of lattice girders. It represents the oscillating mass, whilst the main body represents the reaction mass, of an oscillatory system.

Fig. 4 is a cross section through the trough and main body, in which $a$ again denotes the trough and $c$ the body, the left half of the figure being a section in the vicinity of one of the bolt connections $s$, and the right half near one of the supporting springs $b$.

Fig. 5 is a side elevation of one of the elastic means, which are mounted obliquely in relation to the vertical. The actual spring $b$ is provided, on both sides, with bearing surfaces formed by the means $d, d$ serving to attach the springs to the trough $a$ and the body $c$. Said means are so designed that they allow the springs to act with greater force in the direction of transport than in the opposite direction, or that the elastic means of the oscillatory system exhibit a higher resistance on one side of the central position than on the other, which resistance may increase in linear or more than linear proportion according to the shape of the bearing surfaces or the kind of elastic means employed.

The springs, which are of uniform cross section throughout, bend round the curves in such a way that their leverage, and therefore their periodicity decreases as the bending progresses, and the springs can be compelled to undergo inharmonic flexion. Since the contacting portion of the spring is not subjected to any further bending, it cannot be stressed beyond the prescribed curvature, and is therefore protected to a large extent from overstrain and fracture. The fastening means may be riveted to the ends of the springs $b$, and welded at $e$. At their free ends they may be connected together by special fishplates $f$, and be bolted to the main body at $i$ and to the trough at $o$.

The spring $b$ then forms in conjunction with the angle members $g$ an interchangeable unit which can be rapidly and easily replaced by unscrewing eight screw connections. The individual angle members $d$ may be formed of such a cross-section that they taper off outwardly so that any foreign bodies, coal dust or the like penetrating into the intermediate spaces are automatically ejected again by the oscillating spring.

Figs. 6 and 7 illustrate a reversing coupling such as can be interposed at the centre of the conveyor trough if the latter should be of great length, in order to equalize the unilaterally applied forces. $a^1$ indicates a portion of the trough to which the one half of the complete conveyor trough can be screwed and which thus takes part in the movement of the latter. $a^2$ is a similar portion of the trough adapted to be screwed on to the other half. Said portion $a^2$ is connected with the parts $a^1$ through a reversing lever $u$ by means of two guide levers $v$ and is consequently imparted an opposite direction of motion to the portion of the trough connected thereto. The main bodies of the two halves of the trough are firmly attached together by means of the base member $c^1$ which is provided with screw connections on both sides. The fulcrum of the reversing lever $u$ is however not stationary but mounted on a lever $k$ which is fulcrumed at $m$ and which carries a coupling weight $w$. This arrangement allows the amplitude of the driving half of the trough to be of different dimensions than that of the thus driven half and the amplitude of this latter to be varied by adjusting the coupling weight $w$.

In place of the inertia coupling illustrated by way of example, it is also possible to employ elastic or similarly operating other types of coupling.

Fig. 8 illustrates the drive of the complete trough. (Part C, C of Fig. 3.) An electric motor $m$ is floatingly mounted on a portion $c^2$ of the main body, for example, by means comprising oscillating supports $p$ provided on either side with a stub axle and a preferably adjustable crank $g$. The cranks are articulated, by means of connecting rods $h$, on a connecting piece $s_1$ which may be bolted on to the one or other end of the trough. The main body member $c^2$ is also bolted to the body of the entire trough. This actuating device operates in the following manner: Before starting, the motor M is held in about the central position by the connecting rod $h$, because the directional force of the supporting springs $b$ (Fig. 3) of the trough acts also on the mass of the motor when the driving unit has been bolted to the trough. After the motor has been started, it is obliged to swing to and fro on its supports, and thereby exerts a periodical reaction effort on the trough. For the purpose of establishing a loose coupling, this action of the motor M may be suitably modified by means of an adjustable auxiliary weight G.

Of course, the various constructional details must be regarded merely as typical embodiments, which may be extensively varied without affecting the essence of the invention. Thus, for example, both the trough members and main body members may be of entirely different form and construction, and be attached together by any convenient fastening means. Similarly, the elastic action may be obtained by springs of different shape or materials, and also by means of rubber buffers, air cushions, the action of gravity, and the like.

The driving motor, too, may be actuated by electricity, petrol, compressed air or other actuating medium, or the requisite driving power may be transmitted to the crank through belts, chains or any other actuating means, from any source whatsoever.

The herein described embodiment of the invention operates, in detail and as a whole, in the following manner:

The spring $b$ (Fig. 5) which bends round between the asymmetrically disposed curved surfaces, can be bent for, say 5 mm. in the one direction, and 15 mm. in the other direction; and if the same kinetic energy $\frac{1}{2} m. V^2$ has to be taken up over a path 5mm. in length, and transformed into potential energy during a path 15 mm., then must the force $P_2=3P$. If this condition be fulfilled, then each trough section, that is to say each trough plate attached to its support by means of springs, must be regarded as a relatively undamped, asymmetrically operating oscillatory unit, which describes asymmetrical oscillations corresponding to its own periodicity.

Thus a complete trough of any convenient length can be built up from such single units, and will then display the same properties as each such unit, in respect of periodicity, asymmetrical operations and the like. Such a trough may be energized by any loose coupling, for example by the motor articulated as shown in Fig. 8.

Since, according to the decrement of damping, the oscillating energy fluctuates between 10 and 20 times the working consumption, this multiplied amount of energy must be transmitted from one trough plate to another in all cases in which the energy of oscillation is concentrated in individual elastic means; whereas, with the decentralization of the elastic means employed in the present instance, only the energy absorbed by damping, that is the coupling energy, is transmitted from one plate to another. Moreover, no oscillation nodes can develop within the aggregate in the transmission of these small amounts of energy; and above all, the dreaded destructive effects in the individual plates cannot occur.

The formation of transverse oscillations, which is facilitated by springs with a high degree of obliquity, and by couplings which, similarly to unbalanced devices, exhibit unrestricted freedom, is also lessened in the present case. The transverse oscillations stress the foundation, or cause the freely mounted trough to jump. In the present instance, the angle of slope of the springs is selected so that the transverse components merely reduce the friction between the handled material and the trough, so that no jumping of the freely mounted trough need be feared.

It follows therefore from the foregoing that the spring shown in Fig. 5 acts as a collector spring in the oscillatory system, as supporting spring for the trough members, as guide spring for the curved path to be formed, and as asymmetrical and inharmonic elastic means.

The above described apparatus thus represents a mechanical oscillatory system which, as shown in Figs. 1 and 2, describes asymmetrical and according to the construction selected—harmonic or inharmonic semi-oscillations.

Since the periodicity of inharmonically oscillating systems varies with the stroke—increases therewith in the present instance—suitable designing of the elastic means (e. g. selection of the curve) enables the periodicity to lead the excitation frequency within wide limits, so that, within this range, the position of resonance cannot be attained, and of course also not exceeded. With such systems, therefore, the excellent efficiency of tuned systems, with approximation to the resonance position, is attained, and is maintained within wide limits, without the excitation frequency being kept constant, that is actually turned.

I do not claim broadly herein the "improvements in power transmitting means by oscillatory movements" and the "method of producing oscillatory movements of predetermined amplitude and of transmitting effect from or to a mechanical oscillatory system" and the "oscillating systems" nor other features not especially pointed out in the claims having filed the following separate applications for such features Serial No. 575,894 dated 18 July, 1922, Serial No. 688,876 dated 26 January, 1924 and Serial No. 748,028 dated 6 November, 1924.

I claim.

1. A device of the class described, comprising a resiliently supported mass to be oscillated, and mechanism to oscillate said mass, the said mechanism being floatingly mounted and connected to said mass.

2. A device of the class described, comprising a resiliently supported mass to be oscillated, and mechanism to oscillate said mass, said mechanism being floatingly mounted and connected to the mass to produce oscillations thereof having a frequency corresponding substantially to the natural frequency of oscillation of the mass.

3. A device of the class described, comprising a movably supported mass to be oscillated, mechanism to oscillate said mass, the said mechanism being floatingly mounted and connected to the mass to produce oscillations thereof having a frequency corresponding substantially to the natural frequency of oscillation of the mass, and means constraining the mass to perform asymmetric movement.

4. A device of the class described, comprising a movably supported mass to be oscillated, mechanism to oscillate said mass, said mechanism being floatingly mounted and connected to the mass to produce oscillations thereof having a frequency corresponding substantially to the natural frequency of oscillation of the mass, and means constraining the mass to perform short semi-periods of oscillation toward one side of its position of rest and long semi-periods toward the other side.

5. A device of the class described, comprising a mass to be oscillated, an elastic supporting means therefor, constraining means for the elastic means to cause the mass to move asymmetrically, and mechanism to oscillate said mass, the said mechanism being floatingly mounted and connected to the mass to produce oscillation thereof having a frequency corresponding substantially to the natural frequency of oscillation of the mass.

6. A device of the class described, comprising a movably supported mass to be oscillated, mechanism to oscillate said mass, said mechanism being floatingly mounted and connected to the mass to produce oscillation thereof having a frequency corresponding substantially to the natural frequency of oscillation of the mass, and constraining means to cause the mass to oscillate inharmonically during a semi-period, the oscillation of the mass from its central position describing short semi-periods on one side of its position of rest and a longer semi-period on the other side.

In testimony whereof I affix my signature.

GEORG HEINRICH SCHIEFERSTEIN.